United States Patent
Saito (10) Patent No.: US 10,970,032 B2
(45) Date of Patent: Apr. 6, 2021

(54) SOUND PROCESSING APPARATUS AND METHOD

(71) Applicant: Yamaha Corporation, Hamamatsu (JP)

(72) Inventor: Kosuke Saito, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 16/447,214

(22) Filed: Jun. 20, 2019

(65) Prior Publication Data
US 2019/0303092 A1 Oct. 3, 2019

Related U.S. Application Data

(63) Continuation of application No. PCT/JP2017/045577, filed on Dec. 19, 2017.

(30) Foreign Application Priority Data

Dec. 22, 2016 (JP) .............................. JP2016-249495

(51) Int. Cl.
| | | |
|---|---|---|
| G06F 3/16 | (2006.01) | |
| G06F 3/0481 | (2013.01) | |
| G06F 3/0484 | (2013.01) | |
| G06F 3/0488 | (2013.01) | |
| H04R 3/00 | (2006.01) | |

(52) U.S. Cl.
CPC ............ G06F 3/165 (2013.01); G06F 3/0481 (2013.01); G06F 3/04847 (2013.01); G06F 3/04883 (2013.01); H04R 3/00 (2013.01)

(58) Field of Classification Search
CPC .... G06F 3/165; G06F 3/0481; G06F 3/04847; G06F 3/04883; H04R 3/00
See application file for complete search history.

(56) References Cited

U.S. PATENT DOCUMENTS

| 2006/0222189 A1* | 10/2006 | Terada | ................... | H04H 60/04 |
| | | | | 381/119 |
| 2015/0104042 A1* | 4/2015 | Ito | .......................... | H04H 60/04 |
| | | | | 381/119 |

FOREIGN PATENT DOCUMENTS

| JP | 2006-311513 A | 11/2006 |
| JP | 2006-311514 A | 11/2006 |

OTHER PUBLICATIONS

International Search Report (PCT/ISA/210) issued in PCT Application No. PCT/JP2017/045577 dated Mar. 20, 2018 with English translation (three (3) pages).

(Continued)

*Primary Examiner* — Fan S Tsang
*Assistant Examiner* — David Siegel
(74) *Attorney, Agent, or Firm* — Crowell & Moring LLP (57) ABSTRACT

A plurality of channels each perform signal processing on a respective input signal. An operating device includes a plurality of channel strips, and each of the channel strips is associated with one of the plurality of channels and includes a multi-functional operator to which a desired parameter is assignable. A display control device performs control for displaying on a display screen a plurality of types of parameters related to the signal processing of one of the plurality of channels; and an assignment control device that, in response to any one type of parameter being selected from among the parameters displayed on the display screen, assigns the selected type of parameter to each of the multi-functional operators of the channel strips.

20 Claims, 3 Drawing Sheets

(56) References Cited

OTHER PUBLICATIONS

Japanese-language Written Opinion (PCT/ISA/237) issued in PCT Application No. PCT/JP2017/045577 dated Mar. 20, 2018 (four (4) pages).
International Preliminary Report on Patentability (PCT/IB/338 & PCT/IB/373) issued in PCT Application No. PCT/JP2017/045577 dated Jul. 4, 2019, including English translation of document C2 (Japanese-language Written Opinion (PCT/ISA/237) previously filed on Jun. 20, 2019) (eight (8) pages).
Japanese language Office Action issued in Japanese Application No. 2016-249495 dated Dec. 8, 2020 with English translation (six (6) pages).

* cited by examiner

SOUND PROCESSING APPARATUS AND METHOD

CROSS REFERENCE TO RELATED APPLICATIONS

This application is a continuation of PCT International Application No. PCT/JP2017/045577, filed Dec. 19, 2017, which claims priority under 35 U.S.C. § 119 from Japanese Patent Application No. JP PA 2016-249495, filed Dec. 22, 2016, the entire disclosures of which are herein expressly incorporated by reference.

BACKGROUND

The embodiments of the present invention relate to a sound processing apparatus and method suited for use in an audio mixer and the like.

Generally, existing audio mixers (hereinafter referred to simply as "mixers") are constructed in such a manner that each of a plurality of channels performs sound characteristic adjustment processing on an input sound signal and outputs the thus-processed sound signal selectively to buses, and that each of the buses mixes the sound signals supplied from one or more of the channels and outputs the mixed result to an output destination. Existing digital mixers perform various signal processing, such as channel-specific sound characteristic adjustment processing and sound-signal-path setting processing, exclusively through digital signal processing on digital sound signals. Generally, in such mixers, values of all parameters to be used for such signal processing are stored in a memory.

A plurality of channel strips are provided on an operating panel of the digital mixer, and a human operator can use operators or manual operators, included in each of the channel strips, to adjust the values of the parameters for controlling the signal processing of the channel assigned to the channel strip. Examples of such parameters for controlling the signal processing of one channel include input gain, attenuator, frequency bands and gains of an equalizer, threshold and ratio of a compressor, fader level, bus-specific send levels, panning, channel on/off, and many others. However, if the digital mixer is constructed to include physical operators in one-to-one corresponding relation to these many parameters, not only the number of component parts of the mixer would become enormous, but also a casing of the mixer would increase in size. To avoid such inconveniences, some of the existing digital mixers include a multi-functional operator per channel strip such that a desired parameter is assignable to the multi-functional operator, so as to achieve a reduced number of component parts, reduced size of the casing, and the like.

One of such existing audio mixers, for example, may be configured such that a selection of a parameter to be assigned to the multi-functional operators is made, for example, via a channel strip screen displayed on a display. More specifically, the channel strip screen includes a plurality of channel strip images corresponding to a plurality of channel strips on a physical operating panel, and parameter images indicative of parameters of the channel assigned to the channel strip are displayed in each of the channel strip images. Once any one of the parameter images in any one of the channel strip images is selected on the channel strip screen, the parameter image corresponding to the selected parameter is placed in a selected state in all of the channel strip images, and the selected parameter is assigned to the multi-functional operators of all of the channel strips.

SUMMARY

Although the aforementioned conventionally known channel strip screen enables a brief look at settings of the plurality of channels, it only has a small area for displaying information of each of the channels, and thus, it can display only a portion of the parameter group for controlling the signal processing of the channel. As a consequence, with the conventionally known approach where a desired parameter is selected from the channel strip screen, it is not possible to select such a desired parameter from among all of the parameters for controlling the signal processing of the channel.

There may be another approach for selecting a parameter to be assigned to multi-functional operators, according to which a parameter list screen is displayed on a display and a parameter is selected from the list. This approach, however, requires cumbersome and troublesome operations of separately displaying the list screen only for the purpose of selecting a desired parameter and finding the desired parameter from the displayed list screen and lacks intuitiveness. Also, with this approach, it is difficult to quickly switch the parameter assigned to the multi-functional operators to another parameter.

In view of the foregoing prior art problems, it is one of the objects of the present invention to provide a sound processing apparatus and method which can collectively assign, in response to a simple operation, a desired parameter to multi-functional operators of a plurality of channel strips.

In order to accomplish the aforementioned and other objects, the inventive sound processing apparatus includes: a plurality of channels each performing signal processing on a respective input signal; an operating device including a plurality of channel strips, each of the channel strips being associated with one of the plurality of channels and including a multi-functional operator to which a desired parameter is assignable; a display control device that displays on a display screen a plurality of types of parameters related to the signal processing of any one of the plurality of channels; and an assignment control device that, in response to one type of parameter being selected from among the parameters displayed on the display screen, assigns the selected type of parameter to each of the multi-functional operators of the channel strips.

According to the inventive sound processing apparatus, a user can select any one type of parameter by viewing the display screen displaying the plurality of types of parameters related to the signal processing of one of the plurality of channels. In response to such a selection, the selected type of parameter is assigned commonly to each of the multi-functional operators of the plurality of channel strips. Thus, by merely selecting a desired parameter on the screen displaying the plurality of types of parameters related to the signal processing of one channel, it is possible to assign the same type of parameter collectively not only to the multi-functional operator of the channel strip of the channel currently displayed, but also to the multi-functional operators of the channel strips of the other channels currently not displayed. At this time, because only the plurality of types of parameters related to the signal processing of the one channel have to be displayed on the display screen of the display device, the inventive sound processing apparatus can present, on the single screen of a limited size, much more types of parameters as selectable options than the conventionally known technique where pluralities of parameters are displayed simultaneously for individual ones of the plurality of channels. In this way, a human operator of the inventive sound processing apparatus can select a desired type of parameter, from among a multiplicity of selectable options, without requiring time and labor for displaying another screen, such as a list screen.

As a result, the inventive sound processing apparatus can assign, in response to a simple operation that can be executed intuitively, a desired parameter collectively to the multi-functional operators of the plurality of channel strips and can promptly switch the parameter assigned to the multi-functional operators to another parameter.

The disclosure made herein also embraces a method including steps corresponding to the individual elements constituting the aforementioned inventive sound processing apparatus. Also disclosed herein is a computer-readable, non-transitory storage medium storing a group of instructions executable by one or more processors for performing the aforementioned method.

BRIEF DESCRIPTION OF DRAWINGS

Certain embodiments of the present invention will hereinafter be described in detail, by way of example only, with reference to the accompanying drawings, in which.

DETAILED DESCRIPTION

Figure 1:
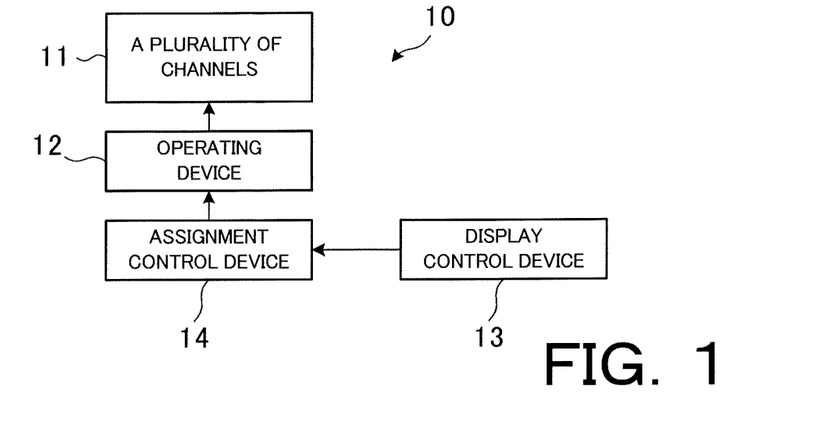
FIG. 1 is a conceptual block diagram illustrating an example construction of the inventive sound processing apparatus.

FIG. 1 is a conceptual block diagram explanatory of an example construction of the inventive sound processing apparatus 10. In FIG. 1, the sound processing apparatus 10 includes: a plurality of channels 11 each performing signal processing on a respective input signal; an operating device 12 including a plurality of channel strips; a display control device 13, and an assignment control device 14. In the operating device 12, each of the channel strips is associated with any one of the plurality of channels 11 and includes a multi-functional operator to which ant desired parameter is assignable. The display control device 13 displays on a display screen a plurality of types of parameters related to the signal processing of any one of the plurality of channels 11. In response to any one of the types of parameters being selected from among the parameters displayed on the display screen, the assignment control device 14 assigns the selected type of parameter to each of the multi-functional operators of the plurality of channel strips.

The sound processing apparatus 10 of FIG. 1 will hereinafter be described as applied, for example, to a digital audio mixer (hereinafter referred to simply as "mixer") that performs signal processing, such as mixing, on sound signals of a plurality of channels.

Figure 2:
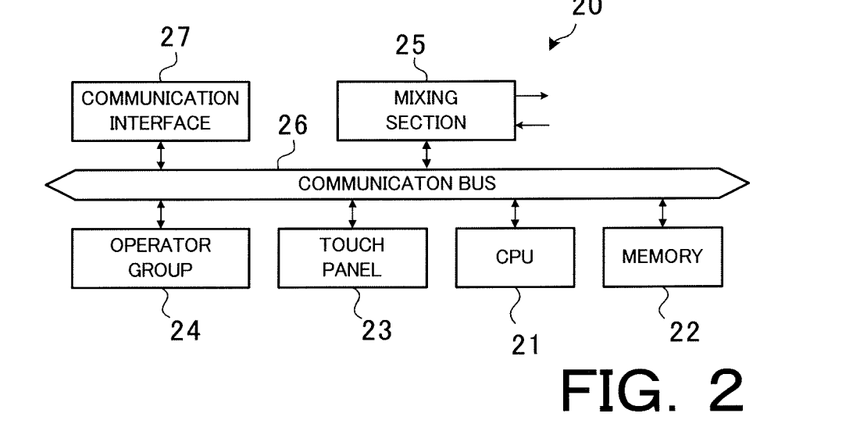
FIG. 2 is a block diagram illustrating an example electric hardware construction of an audio mixer to which the sound processing apparatus of FIG. 1 is applied.

FIG. 2 is a block diagram illustrating an example electric hardware construction of the mixer 20. In FIG. 2, the mixer 20 includes a CPU (Central Processing Unit) 21, a memory 22, a touch panel 23, an operator group 24, and a mixing section ("MIX" in the FIG. 25, and these components 21 to 25 are interconnected via a bus 26.

The CPU 21 controls the mixer 20 by executing various programs stored in the memory 22. The memory 22 not only non-volatilely stores various programs to be executed by the CPU 21, various data, etc., but also is used as a loading area for loading programs to be executed by the CPU 21 and as a working area. The memory 22 may be constructed by combining, as necessary, various memory devices, such as a read-only memory, a random-access memory, a flash memory, and a hard disk. Further, the memory 22 stores, for all of the channels, value of all parameters to be used for channel-specific signal processing by the mixing section 25 to be described below.

The touch panel 23 includes a display mechanism that executes various display under the control of the CPU 21, and a detection mechanism that detects a touch on the touch panel 23 by a user's finger or the like. The display mechanism may be in the form of a conventionally known panel-type display (namely, display panel), such as a liquid crystal panel or an organic EL display. The detection mechanism detects a touched position on the touch panel 23 and outputs to the CPU 21 a detection signal corresponding to the detected touched position, and the detection mechanism may include a conventionally known transparent touch detecting sheet disposed on the front surface of the panel-type display. In this specification, an input operation executed by touching the screen of the touch panel 23 will hereinafter be referred to as "touch". The display screen to be controlled by the display control device 13 of FIG. 1 is generated by the touch panel 23. Further, the touch panel 23 functions also as a selector configured to, in response to a user's operation, select any one of the plurality of types of parameters displayed on the display screen by the display control device 13.

Figure 5:
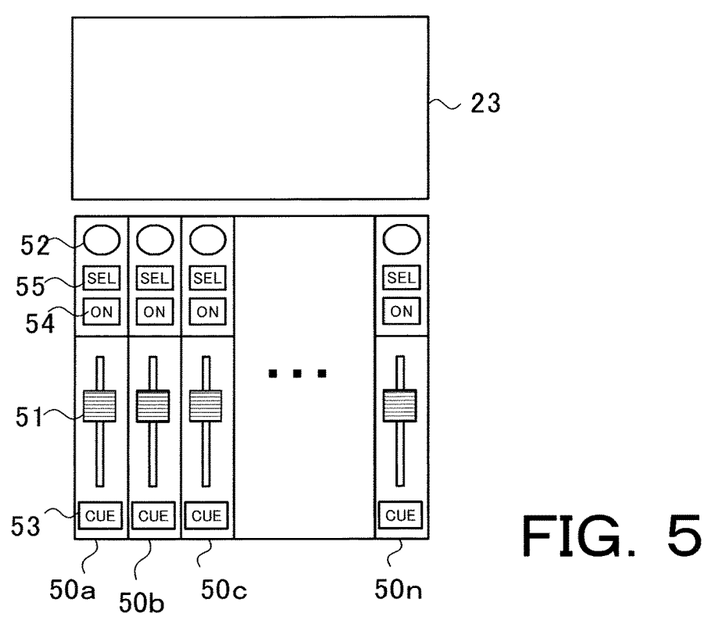
FIG. 5 is a block diagram explanatory of an example construction of an operating panel of the audio mixer of FIG. 2.

The operator group 24 includes, among others, a plurality of operators or manual operators disposed on the operating panel of the mixer 20, related interface circuits, and a plurality of channel strips. An example construction of the operating panel is illustrated in FIG. 5 to be described later.

The mixing section 25 is constituted by a signal processing device that is virtually implemented, for example, by a DSP (Digital Signal Processor), the CPU 21, and software stored in the memory 22. By executing a signal processing program, the mixing section 25 processes one or more sound signals supplied from not-shown input equipment and outputs the resultant processed sound signals to not-shown output equipment. A communication interface 27 for communicating with an external device (not shown) may be connected to the bus 26.

Figure 3:
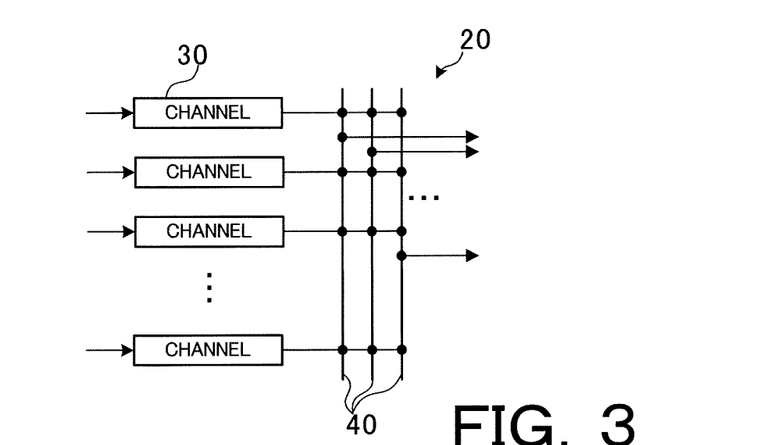
FIG. 3 is a block diagram showing an example construction of signal processing performed in the audio mixer of FIG. 2.

FIG. 3 is a block diagram showing an example construction of the signal processing performed by the mixing section 25. As illustrated in FIG. 3, the mixer 20 includes a plurality of channels 30 and a plurality of buses 40. Each of the channels 30 performs various signal processing, including sound volume adjustment, on an input sound signal, and supplies the processed sound signal to one or more of the buses 40 selected by a human operator. Each of the buses 40 mixes sound signals supplied from one or more of the channels 30 and outputs the resultant mixed sound signal via a corresponding output channel (not shown). The signal processing by the mixing section 25 is controlled on the basis of values of various parameters stored in the memory 22.

Figure 4:
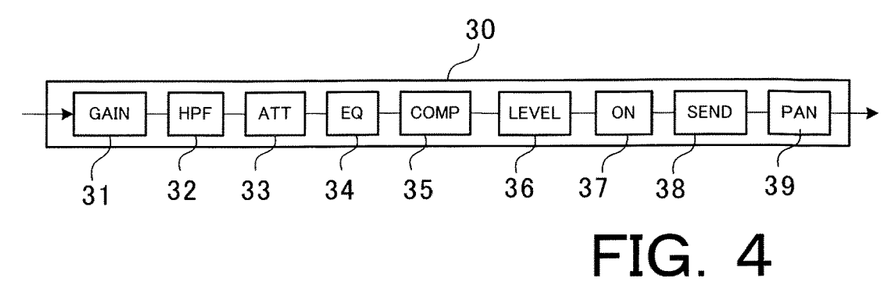
FIG. 4 is a block diagram illustrating an example construction of signal processing of one channel.

FIG. 4 illustrates an example construction of the signal processing of one of the channels. The one channel 30 includes, as control factors for controlling the signal processing, input gain ("GAIN" in the FIG. 31, high-pass filter ("HPF" in the FIG. 32, attenuator ("ATT" in the FIG. 33, equalizer ("EQ" in the FIG. 34, compressor ("COMP" in the FIG. 35, fader level ("LEVEL" in the FIG. 36, channel ON/OFF ("ON" in the FIG. 37, bus-specific send levels ("SEND" in the FIG. 38, panning (PAN) 39, and the like. A plurality of parameters for controlling these control factors 31 to 39 are "a plurality of parameters for controlling the signal processing of one channel". These control factors 31 to 39 are each controlled by one or more parameters. For example, the equalizer 34 is controlled by a plurality of parameters that are a plurality of (for example, four) frequency bands, bands-specific gains, and bands-specific bandwidths, and the send level 38 has a plurality of values corresponding to the buses 40. Thus, the number of the parameters for controlling the signal processing of one channel would become very large.

FIG. 5 illustrates an example construction of the operating panel of the mixer 20.

The operating panel 23 includes a plurality n of (for example, twelve) channel strips 50a, 50b, 50n laterally arranged parallel to one another below the touch panel 23 (namely, on a front side closer to the position of the human operator). In this specification, an up-down direction (vertical direction) represents a depth direction as viewed from the front side of the operating panel (from the position of the human player), namely, an up-down direction in FIG. 5. Any one of the channels is associated with each of the channel strips 50a, 50b, 50n. For example, channels "CH13" to "CH24" are assigned, sequentially from left to right in the figure, to the channel strips 50a, 50b, 50n.

Each of the channel strips 50a, 50b, 50n includes a plurality of physical operators 51 to 55 for adjusting values of a plurality of parameters related to the signal processing of the channel associated with the channel strip. The physical operators of each of the channel strips include, for example, a sound-volume adjusting fader operator 51, a multi-functional operator 52 to which a desired type of parameter is assignable, a CUE key 53 for switching between CUE-ON and CUE-OFF states, an ON/OFF key 54 for switching between ON and OFF states of the channel, and a selection key 55 for selecting the channel. For convenience of illustration and description, only the operators 51 to 55 of one of the channel strips 50a are depicted with the reference numerals. The channel strips 50a, 50b, 50n, each including the plurality of physical operators 51 to 55, are included in the operator group 24 of FIG. 2.

In each of the channel strips 50a, 50b, 50n, particular types of parameters are fixedly assigned, as objects of control, to the fader operator 51, CUE key 53, ON/OFF key 54, and selection key 55. A desired type of parameter selected by the user is assigned, as an object of control, to the multi-functional operator 52. Such a parameter to be assigned to the multi-functional operator 52 may be selected via a screen displayed on the touch panel 23. In other words, the multi-functional operator 52 is provided basically for adjusting the value of the type of parameter selected via the screen displayed on the touch panel 23.

Figure 6:
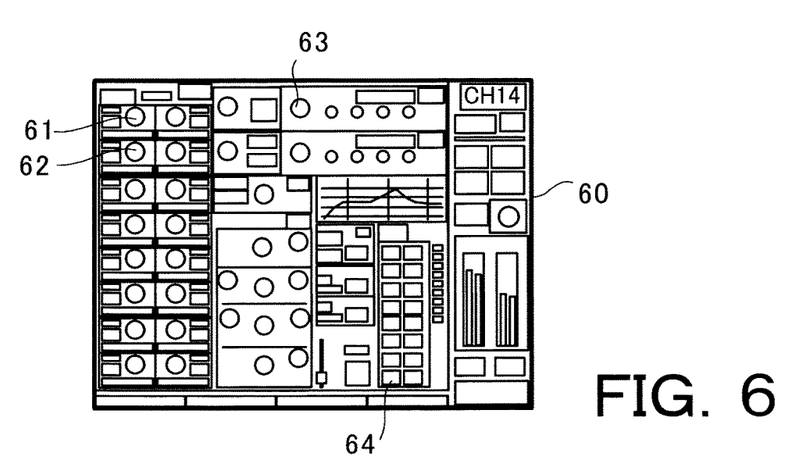
FIG. 6 is a diagram illustrating an example of a detailed screen displayed on a touch panel.

FIG. 6 illustrates an example of the screen displayed on the touch panel 23 for selecting a parameter to be assigned to the multi-functional operator 52. More specifically, this screen is a detailed screen 60 that collectively displays in detail all parameters related to the signal processing of one channel (hereinafter referred to also as "parameters of one channel"). As will be described in detail later, the mixer 20, to which the inventive sound processing apparatus is applied, is characterized in that in response to a desired parameter being selected from the detailed screen 60 displaying the parameter group of one channel as illustrated in FIG. 6, the selected parameter is assigned collectively (commonly) to the multi-functional operators 52 of all of the channel strips 50a, 50b, 50n. Because the detailed screen 60 displays, together in an arranged fashion on the single screen, a plurality of types of parameters related to the signal processing of one channel (for example, all parameters related to the signal processing of one channel), the screen 60 can present, as selectable options, much more types of parameters than the conventionally known screen that displays, together in an arranged fashion on the single screen, parameter groups of a plurality of channels on a channel-by-channel basis.

Figure 7:
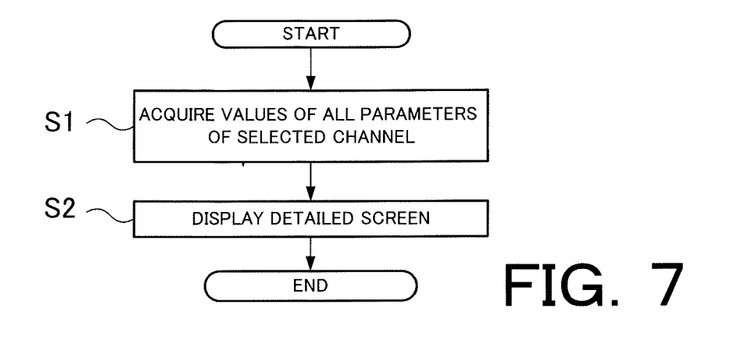
FIG. 7 is a flow chart illustrating an example of a process for displaying the detailed screen.

FIG. 7 is a flow chart illustrating an example of a process for displaying the detailed screen 60 of a given one of the channels. Once the human operator selects a desired one of the channels and gives a display instruction by using the physical operators etc. on the operating panel, the CPU 21 starts the process of FIG. 7. At step S1, the CPU 21 identifies all types of parameters related to the selected channel and acquires a value of each of the identified parameters from the memory 22. At step S2, the CPU 21 displays the detailed screen 60 of the selected channel on the basis of each of the acquired values of the identified parameters. As an example, the channel currently displayed on the detailed screen 60 can be selected from among all of the channels provided in the mixer 20. As another example, the channel displayed on the detailed screen 60 can be selected from among all of the channels associated with the channel strips 50a, 50b, 50n. Such operations of steps S1 and S2 performed by the CPU 21 correspond to a function of "the display control device 13 that displays on the display screen a plurality of types of parameters related to the signal processing of any one of the plurality of channels 11".

In FIG. 6, various parameter images 61, 62, 63, 64, . . . displayed on the detailed screen 60 are associated with parameters of the selected channel. More specifically, the parameter images 61, 62, 63, 64, . . . are associated with a plurality of types of parameters for controlling the individual control factors 31 to 39 illustrated in FIG. 4, such as input gain, cut-off frequency and bandwidth of a high-pass filter, attenuator, frequency bands and band-specific gains and bandwidths of an equalizer, threshold and ratio of a compressor, channel ON/OFF, bus-specific send levels, and panning. All types of parameters related to (namely, for controlling) the signal processing of the selected channel are displayed by these parameter images 61, 62, 63, 64, . . . . Such parameter images 61, 62, 63, 64, . . . are represented in various forms, such as an operator image simulating a shape of an operator, a numerical value image, and a graph image indicative of filter characteristics, and these images additionally indicate, in numerical values or scale images, current values of the parameters which the images are associated with. Note that for convenience of illustration and description, only a portion of the parameters displayed on the detailed screen 60 are depicted with reference numerals 61, 62, 63, 64, . . . .

The parameter images 61, 62, 63, 64, . . . function as button images each operable to select the corresponding parameter. Because the detailed screen 60 displays all of the parameters of the selected one channel together in an arranged fashion on the single screen, the human operator can select a desired parameter from among all of the parameters for controlling the signal processing of the selected one channel, without requiring time and labor for switching to another screen or displaying a parameter list screen in order to find the desired parameter.

Figure 8:
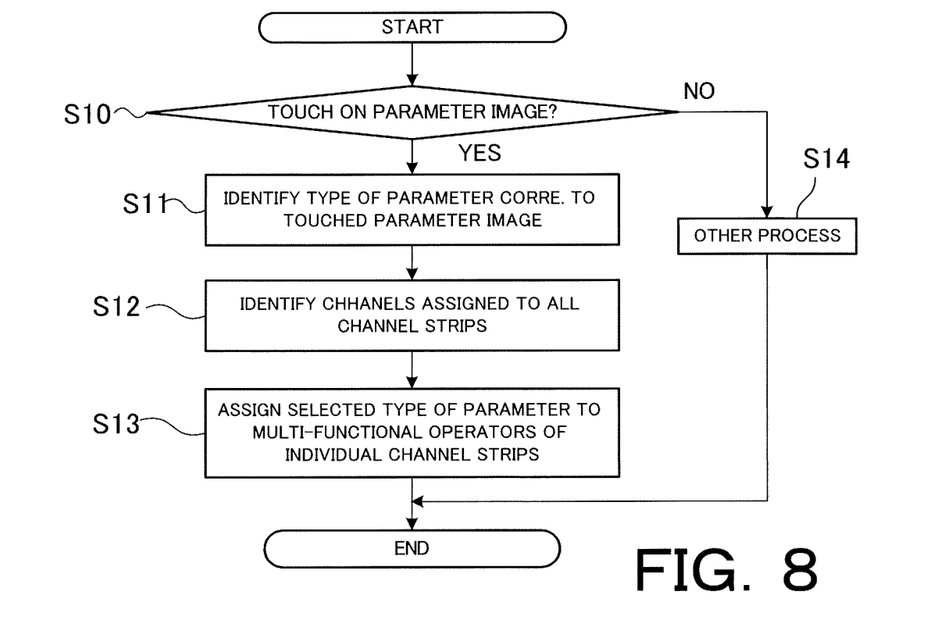
FIG. 8 is a flow chart illustrating an example of a process responsive to a touch.

FIG. 8 is a flow chart illustrating an example of a process performed by the CPU 21 in response to a user's touch on the detailed screen 60. At step S10, the CPU 21 determines, on the basis of the user-touched position on the detailed screen 60, whether or not the user's touch is on any one of the parameter images 61, 62, 63, 64, . . . . When any one of the parameter images 61, 62, 63, 64, . . . is touched by the user (Yes determination at step S10), the CPU 21 identifies the type of the parameter associated with the touched parameter image, at step S11. In this manner, the parameter type corresponding to the touched parameter image is selected for the one channel being displayed on the detailed screen 60. For example, when the parameter image corresponding to the panning is touched while the detailed screen 60 of channel No. "CH14" is being displayed on the touch panel 23, the panning is selected as the parameter type.

At step S12, the CPU 21 identifies the channels associated with the individual channel strips 50*a*, 50*b*, 50*n*. Then, at step S13, the CPU 21 assigns the selected type of parameter commonly to the multi-functional operators 52 of all of the 50*a* to 50*n* and then ends the process. In this way, in response to the parameter selection on the detailed screen 60 displaying all of the parameters of the one channel, it is possible to assign the selected parameter type connectively to the multi-functional operators 52 of all of the channel strips 50*a*, 50*b*, 50*n*. When a position of the detailed screen other than the positions of the parameter images 61, 62, 63, 64, . . . is touched (No determination at step S10), the CPU 21 performs a process corresponding to the touched position (step S14) and then ends the process. The operations performed by the CPU 21 at steps S11 and S13 correspond to a function of the "assignment control device 14 that, in response to any one type of parameter being selected from among the displayed parameters, assigns the selected type of parameter to each of the multi-functional operators of the plurality of channel strips". Namely, the selected type of parameter is identified at step S11, and the thus-identified type of parameter is assigned commonly to the multi-functional operators of the individual channel strips at step S13.

Figure 9:
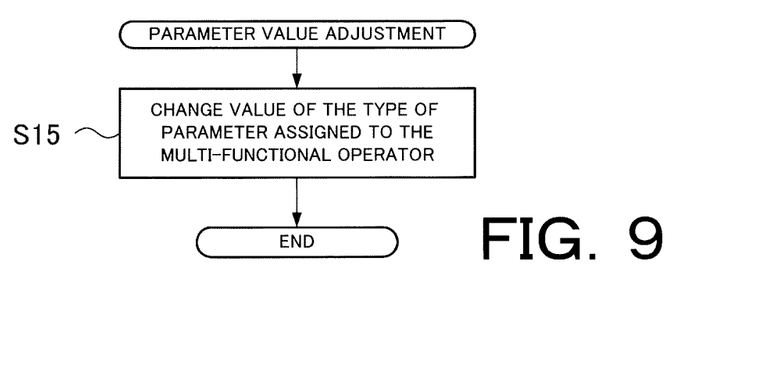
FIG. 9 is a flow chart illustrating an example of a parameter value adjustment process responsive to an operation of a multi-functional operator.

Once the multi-functional operator 52 of any one of the channel strips 50*a*, 50*b*, 50*n* is operated following the process of FIG. 8, a parameter value adjustment process illustrated in FIG. 9 is performed. The CPU 21 changes, in accordance with an operated amount (such as a rotated amount of a knob portion) of the operated multi-functional operator 52, the value of the type of parameter currently assigned to the multi-functional operator 52 of the channel assigned to the channel strip which the operated multi-functional operator 52 belongs to (step S15 of FIG. 9). In this manner, the value of the type of parameter related to the channel and stored in the memory 22 is updated, and the updated result is reflected in the signal processing to be performed by the mixing section 25. Note that if the channel currently displayed on the detailed screen 60 is the channel assigned to the channel strip which the operated multi-functional operator 52 belongs to, the CPU 21 updates the display of a corresponding one of the parameter images 61, 62, 63, 64, . . . on the detailed screen 60. If, on the other hand, the multi-functional operator 52 belonging to a channel strip corresponding to a channel other than the channel currently displayed on the detailed screen 60 has been operated, only updating of the value of the parameter stored in the memory 22 is executed without the display updating of the detailed screen 60 being executed.

Let it be assumed here that channels "CH13" to "CH24" are currently assigned to the channel strips 50*a*, 50*b*, 50*n*, respectively, and that the detailed screen 60 of channel No. "CH14" is currently displayed on the touch panel 23. In such a case, when the parameter image 63 associated with the panning is touched, for example, panning of the corresponding channels "CH13" to "CH24" is assigned to the multi-functional operators 52 of the twelve channel strips 50*a*, 50*b*, 50*n*; namely, panning of channel CH13 is assigned to the multi-functional operator 52 of the channel strip 50*a*, panning of channel CH14 is assigned to the multi-functional operator 52 of the channel strip 50*b*, panning of channel CH15 is assigned to the multi-functional operator 52 of the channel strip 50*c*, and so on.

According to the above-described construction where parameter assignment to the multi-functional operators 52 of all of the channel strips 50*a*, 50*b*, 50*n* is executed in response to a parameter selection on the detailed screen 60 of one channel, all types of parameters of the one channel are presented as selectable options together on the single screen. Thus, it is possible to select a desired parameter, from among all of the parameters for controlling the signal processing of the one channel, through an intuitive operation, without requiring time and labor for switching to another screen or displaying a parameter list screen in order to find the desired parameter, and it is also possible to assign the selected parameter collectively to the multi-functional operators 52 of the individual channel strips 50*a*, 50*b*, 50*n*. Further, by merely selecting a parameter on the detailed screen 60 related to one given channel, it is possible to assign a parameter of the same type as the selected parameter not only to the multi-functional operator 52 of the channel strip of the channel currently displayed on the detailed screen 60, but also to the multi-functional operators 52 of the channel strips of a plurality of the other channels not displayed on the detailed screen 60. Thus, the human operator can promptly and easily execute an operation for, while making detailed adjustment for the one channel with reference to the detailed screen 60, adjusting, for the other channels as well, the parameter of the same type as the parameter selected on the detailed screen 60.

In another embodiment, a combination of a plurality of parameters may be assigned to one of the multi-functional operators 52 so that respective values of the plurality of parameters can be adjusted via the one multi-functional operator 52. In such a case, one parameter image on the detailed screen 60 is associated with the combination of parameters, and in response to a touch on the one parameter image, the selected combination of parameters is assigned to the multi-functional operators 52 of the individual channel strips 50*a*, 50*b*, 50*n*. More specifically, two parameters, i.e. threshold and ratio, of the compressor 35, for example, are associated with the parameter image associated with the compressor 35. In response to a touch on the parameter image, the CPU 21 assigns the threshold and ratio of the compressor 35 to the multi-functional operators 52 of the individual channel strips 50*a*, 50*b*, 50*n* for the channels associated with the channel strips (step S13 above). In this case, in response to an operation of one of the multi-functional operators 52, the CPU 21 changes the threshold value and ratio value of the compressor 35 of the associated channel (step S15 above). Namely, in this specification, the parameter to be selected on the detailed screen 60 of the touch panel 23 (namely, the parameter associated with the parameter image) or the type of parameter to be assigned to the multi-functional operator 52 may include a "combination of a plurality of parameters" to be controlled via the single multi-functional operator 52.

In still another embodiment, the detailed screen 60 to be displayed by the display control device 13 is not necessarily limited to the one that displays all parameters of one channel and may be any desired screen as long as the screen displays a group of parameters of one channel. For example, the detailed screen 60 may be a screen that displays in detail effecter settings related to the one channel.

Further, the touch panel 23 is not limited to the one incorporated in the casing of the mixer 20 and may be a touch panel provided on external equipment, such as a tablet terminal externally connected to the mixer 20.

In still another embodiment, the display device for generating a display screen is not limited to the display panel 23 and may be constructed of a combination of a display having no operation input function responsive to a touch on the screen and a selector for selecting a desired one of selectable icons displayed on the screen of the display. In such a case, the selector may be a particular physical operator included in the operator group 24, or an operation input device, such as a mouse or keyboard; for example, it is possible to select a desired parameter by moving a cursor, displayed on the screen, to an icon corresponding to the desired parameter and then clicking on the icon.

In still another embodiment, the mixer 20 is not limited to the dedicated mixer apparatus and may be constructed of a general-purpose computer apparatus, such as a portable computer device or apparatus (so-called "slate device") having the touch panel 23 incorporated in the body of the computer apparatus, that has installed therein a program for performing the signal processing (mixing processing) of FIG. 3.

Furthermore, the inventive sound processing apparatus 10 may be applied to any desired types of processing apparatus, such as a recorder and a processor, rather than being applied only to the mixer 20. For example, the sound processing apparatus 10 may be applied to a video mixer that performs processing, such as mixing processing, on video images and may have the sound processing function at least partially. Furthermore, the sound processing apparatus 10 is not limited to the dedicated sound processing apparatus and may be in the form of a personal computer having a DAW (Digital Audio Workstation) software application executably installed therein.

Furthermore, the display device (for example, the touch panel 23) for generating a display screen is not limited to the one attached to the sound processing apparatus 10 (or the mixer 20) and may be one provided independently of the sound processing apparatus 10 (or the mixer 20), such as a display of a portable telephone terminal or the like. In such a case, the sound processing apparatus 10 (or the mixer 20) may be configured to communicate with an external device, such as the portable telephone terminal or the like, via the communication interface 27 and generate a display screen, related to an embodiment of the present invention, on a display of the external device (e.g., the portable telephone terminal). For example, information of the plurality of types of parameters related to the signal processing of any one of the plurality of channels 50*a*, 50*b*, 50*n* may be transmitted to the external device via the communication interface 27, and the display screen may be generated via the external device so as to display the plurality of types of parameters based on the transmitted information. In such a case, the assignment control device 14 may be configured to assign, in response to a user's selection operation performed via the external device (e.g., the portable telephone terminal), the selected type of parameter to each of the multi-functional operators 52 of the channel strips 50*a*, 50*b*, 50*n*.

Furthermore, the sound processing apparatus 10 may be in the form of a dedicated hardware apparatus (integrated circuitry and the like) configured to perform the functions of the devices 11, 12, 13, and 14 illustrated in FIG. 1. What's more, the sound processing apparatus 10 may include a processor device having a function for executing at least a portion of the functions of the devices 11, 12, 13, and 14 illustrated in FIG. 1.

One form of the present invention understood from the above-described embodiments is a sound processing apparatus which includes: a plurality of channels (11) each performing signal processing on a respective input signal; an operating device (12) including a plurality of channel strips (50*a* to 50*n*), each of the channel strips being associated with any one of the plurality of channels and including a multi-functional operator to which a desired parameter is assignable; and a processor (21) configured to perform: a display control task (S1 and S2) that displays on a display screen a plurality of types of parameters related to signal processing of any one of the plurality of channels; an assignment control task (S11 and S13) that, in response to any one type of parameter being selected from among the parameters displayed on the display screen, assigns the selected type of parameter to each of the multi-functional operators of the channel strips.

Further, the embodiment of the present invention according to the control performed by the CPU 21 can be understood as a method for assigning a parameter to a multi-functional operator in a sound processing apparatus which includes a plurality of channels each performing signal processing on a respective input signal, and an operating device including a plurality of channel strips, each of the channel strips being associated with any one of the plurality of channels and including the multi-functional operator to which a desired parameter is assignable. The method includes: displaying on a display screen a plurality of types of parameters related to signal processing of any one of the plurality of channels; and, in response to any one type of parameter being selected from among the parameters displayed on the display screen, assigning the selected type of parameter to each of the multi-functional operators of the channel strips. Further, the embodiment of the present invention according to the control performed by the CPU may be constructed and carried out as an invention of a program that causes a computer to perform the individual steps constituting the aforementioned method.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A sound processing apparatus comprising:
   a plurality of channels each performing signal processing on a plurality of input signals;
   an operating device including a plurality of channel strips, each of the plurality of channel strips being associated with one of the plurality of channels and including a multi-functional operator to which a desired parameter is assignable;
   a selecting operator operable by a user to select any one of the plurality of channels;
   a display control device that displays on a display screen a plurality of types of parameters related to the signal processing of only the selected one channel; and
   an assignment control device that, in response to one type of parameter being selected from among the plurality of types of parameters displayed on the display screen, assigns the selected type of parameter commonly to each of the multi-functional operators of the plurality of channel strips, wherein
      the multi-functional operators of the plurality of channel strips are each associated with each of the plurality of channels, and
      the plurality of input signals in the plurality of channels are controlled by the selected type of parameter in response to an operation of the multi-functional operators of the plurality of channel strips associated with the channels.

2. The sound processing apparatus as claimed in claim 1, wherein the display control device displays on the display screen all of the types of parameters for controlling the signal processing of the selected one channel.

3. The sound processing apparatus as claimed in claim 1, wherein the assignment control device identifies the selected type of parameter and assigns the identified type of parameter commonly to each of the multi-functional operators of the plurality of channel strips.

4. The sound processing apparatus as claimed in claim 1, further comprising a selector configured to select, in response to a user's operation, one of the plurality of types of parameters displayed on the display screen by the display control device.

5. The sound processing apparatus as claimed in claim 4, wherein the selector comprises a transparent touch detecting sheet disposed on a front surface of a display panel that is provided for generating the display screen.

6. The sound processing apparatus as claimed in claim 4, wherein the assignment control device identifies the selected type of parameter and assigns the identified type of parameter commonly to each of the multi-functional operators of the plurality of channel strips.

7. The sound processing apparatus as claimed in claim 2, further comprising a selector configured to select, in response to a user's operation, one of the plurality of types of parameters displayed on the display screen by the display control device.

8. The sound processing apparatus as claimed in claim 7, wherein the selector comprises a transparent touch detecting sheet disposed on a front surface of a display panel that is provided for generating the display screen.

9. The sound processing apparatus as claimed in claim 7, wherein the assignment control device identifies the selected type of parameter and assigns the identified type of parameter commonly to each of the multi-functional operators of the plurality of channel strips.

10. The sound processing apparatus as claimed in claim 1, further comprising a display device that generates the display screen.

11. The sound processing apparatus as claimed in claim 1, further comprising a communication interface that communicates with an external device, wherein the display screen is generated via the external device.

12. The sound processing apparatus as claimed in claim 11, wherein the assignment control device assigns, in response to a user's selection operation performed via the external device, the selected type of parameter to each of the multi-functional operators of the plurality of channel strips.

13. The sound processing apparatus as claimed in claim 1, wherein the display control device and the assignment control device are implemented by a processor that is configured to perform tasks of the display control device and the assignment control device.

14. A method for assigning a parameter to a multi-functional operator in a sound processing apparatus, the sound processing apparatus including a plurality of channels each performing signal processing on a plurality of input signals, and an operating device including a plurality of channel strips, each of the plurality of channel strips being associated with one of the plurality of channels and including a multi-functional operator to which a desired parameter is assignable, the method comprising:
   selecting any one of the plurality of channels;
   displaying on a display screen a plurality of types of parameters related to the signal processing of only the selected one channel; and
   in response to one type of parameter being selected from among the plurality of types of parameters displayed on the display screen, assigning the selected type of parameter commonly to each of the multi-functional operators of the plurality of channel strips, wherein
      the multi-functional operators of the plurality of channel strips are each associated with each of the plurality of channels, and
      the plurality of input signals in the plurality of channels are controlled by the selected type of parameter in response to an operation of the multi-functional operators of the plurality of channel strips associated with the channels.

15. The method as claimed in claim 14, wherein the plurality of types of parameters related to the signal processing displayed on the display screen are all of the types of parameters for controlling the signal processing of the selected one channel.

16. The method as claimed in claim 14, wherein the selected type of parameter is identified and the identified type of parameter is assigned commonly to each of the multi-functional operators of the plurality of channel strips.

17. The method as claimed in claim 14, wherein, in response to one type of parameter being selected, via a user's operation, from among the parameters displayed on the display screen, the selected type of parameter is assigned to each of the multi-functional operators of the plurality of channel strips.

18. The method as claimed in claim 17, wherein, in response to a user's operation of a selector comprising a transparent touch detecting sheet that is disposed on a front surface of a display panel that is provided for generating the display screen, the one type of parameter is selected from among the parameters displayed on the display screen.

19. The method as claimed in claim 14, wherein information of the plurality of types of parameters related to the signal processing of any one of the plurality of channels is transmitted to an external device via a communication interface, and wherein the display screen is generated via the external device to display the plurality of types of parameters based on the transmitted information.

20. A computer-readable, non-transitory storage medium storing a program executable by one or more processors for performing a method for assigning a parameter to a multi-functional operator in a sound processing apparatus, the sound processing apparatus including a plurality of channels each performing signal processing on a plurality of input signals, and an operating device including a plurality of channel strips, each of the plurality of channel strips being associated with one of the plurality of channels and including a multi-functional operator to which a desired parameter is assignable, the method comprising:

selecting any one of the plurality of channels;

displaying on a display screen a plurality of types of parameters related to the signal processing of only the selected one channel; and in response to one type of parameter being selected from among the plurality of types of parameters displayed on the display screen, assigning the selected type of parameter commonly to each of the multi-functional operators of the plurality of channel strips, wherein the multi-functional operators of the plurality of channel strips are each associated with each of the plurality of channels, and the plurality of input signals in the plurality of channels are controlled by the selected type of parameter in response to an operation of the multi-functional operators of the plurality of channels trips associated with the channels.

* * * * *